US012071138B2

(12) United States Patent
Takenaka

(10) Patent No.: US 12,071,138 B2
(45) Date of Patent: Aug. 27, 2024

(54) WORK MACHINE AND METHOD FOR CONTROLLING WORK MACHINE

(71) Applicant: KOMATSU LTD., Tokyo (JP)

(72) Inventor: Yuita Takenaka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 546 days.

(21) Appl. No.: 17/420,162

(22) PCT Filed: Mar. 6, 2020

(86) PCT No.: PCT/JP2020/009839
§ 371 (c)(1),
(2) Date: Jul. 1, 2021

(87) PCT Pub. No.: WO2020/195727
PCT Pub. Date: Oct. 1, 2020

(65) Prior Publication Data
US 2022/0063624 A1   Mar. 3, 2022

(30) Foreign Application Priority Data

Mar. 28, 2019   (JP) .................................. 2019-062993

(51) Int. Cl.
*B60W 30/188*   (2012.01)
*B60W 10/04*   (2006.01)
(Continued)

(52) U.S. Cl.
CPC .......... *B60W 30/188* (2013.01); *B60W 10/06* (2013.01); *B60W 10/101* (2013.01);
(Continued)

(58) Field of Classification Search
CPC .... B60W 30/188; B60W 30/10; B60W 30/06; B60W 30/101; B60W 2520/105;
(Continued)

(56) References Cited

U.S. PATENT DOCUMENTS 9,163,386 B2 * 10/2015 Shirao .................. F16H 61/421
9,677,246 B2 *  6/2017 Yoshizawa ............... B60K 6/54
(Continued)

FOREIGN PATENT DOCUMENTS

EP    2 568 148 A1   3/2013
JP       4-19463 A    1/1992
(Continued)

OTHER PUBLICATIONS

International Search Report for the corresponding international application No. PCT/JP2020/009839, issued on Jun. 9, 2020.
(Continued)

*Primary Examiner* — Tinh Dang
(74) *Attorney, Agent, or Firm* — Global IP Counselors, LLP

(57) ABSTRACT

A work machine includes an engine, a transmission connected to the engine to change a transmission gear ratio continuously, a travel device connected to the transmission to cause the work machine to travel, a sensor arranged and configured to detect an acceleration of the work machine, and a controller. The controller selectively execute a first mode and a second mode that limits a target tractive force of the machine in comparison to the first mode. The controller weakens limitation of the target tractive force and determines the target tractive force when the acceleration of the machine in the second mode is less than a predetermined acceleration threshold. The controller determines a target transmission gear ratio in accordance with the target tractive force. The controller controls the transmission based on the target transmission gear ratio.

13 Claims, 9 Drawing Sheets

(51) Int. Cl.
  *B60W 10/06* (2006.01)
  *B60W 10/101* (2012.01)
  *E02F 9/20* (2006.01)
  *E02F 9/22* (2006.01)
  *F02D 41/02* (2006.01)
  *F16H 59/04* (2006.01)
  *F16H 59/18* (2006.01)
  *F16H 59/44* (2006.01)
  *F16H 59/48* (2006.01)
  *F16H 59/70* (2006.01)
  *F16H 61/66* (2006.01)
  *E02F 9/08* (2006.01)

(52) U.S. Cl.
  CPC ............ *E02F 9/202* (2013.01); *E02F 9/2253* (2013.01); *F02D 41/0215* (2013.01); *F16H 59/18* (2013.01); *F16H 59/44* (2013.01); *F16H 59/48* (2013.01); *F16H 59/70* (2013.01); *F16H 61/66* (2013.01); *B60W 2520/105* (2013.01); *B60W 2540/10* (2013.01); *B60W 2710/06* (2013.01); *B60W 2710/1005* (2013.01); *E02F 9/0841* (2013.01)

(58) Field of Classification Search
  CPC ......... B60W 2540/10; B60W 2710/06; B60W 2710/1005
  See application file for complete search history.

(56) References Cited

U.S. PATENT DOCUMENTS

| | | | |
|---|---|---|---|
| 9,745,722 B2 * | 8/2017 | Monden | .................... B60L 7/26 |
| 2006/0276948 A1 | 12/2006 | Toda | |
| 2009/0217654 A1 | 9/2009 | Iwamoto | |
| 2015/0315767 A1 * | 11/2015 | Miyamoto | ............ B60W 10/08 903/945 |
| 2017/0145659 A1 * | 5/2017 | Yoshizawa | ............ E02F 9/2296 |

FOREIGN PATENT DOCUMENTS

| | | |
|---|---|---|
| JP | 10-248106 A | 9/1998 |
| JP | 2003-48461 A | 2/2003 |
| JP | 2008-120172 A | 5/2008 |
| JP | 2011-99376 A | 5/2011 |
| JP | 2014-163323 A | 9/2014 |
| JP | 2016-89821 A | 5/2016 |
| JP | 2017-58007 A | 3/2017 |
| WO | 2005/024208 A1 | 3/2005 |

OTHER PUBLICATIONS

Extended European search report for the corresponding European application No. 20780061.6, issued on Sep. 20, 2022.

The Office Action for the corresponding Chinese application No. 202080008050.8, issued on Jun. 3, 2024.

* cited by examiner

WORK MACHINE AND METHOD FOR CONTROLLING WORK MACHINE

This application is a U.S. National stage application of International Application No. PCT/JP2020/009839, filed on Mar. 6, 2020. This U.S. National stage application claims priority under 35 U.S.C. § 119(a) to Japanese Patent Application No. 2019-062993, filed in Japan on Mar. 28, 2019, the entire contents of which are hereby incorporated herein by reference.

BACKGROUND

Field of the Invention

The present disclosure relates to a work machine and a method for controlling a work machine.

Background Information

As described in WO 2005/024208 A1, a high-output mode and a low-output mode are set as control modes for the engine in a work machine. In the low-output mode, the maximum tractive force for each vehicle speed is reduced in comparison to the high-output mode. The switching between the low-output mode and the high-output mode is performed automatically in response to a load applied to the work machine. For example, the high-output mode is selected when the work machine is traveling on a steeply sloped road. Conversely, the low-output mode is selected when the work machine is traveling on flat ground.

SUMMARY

In the abovementioned work machine, the low-output mode is selected when the load is small. Therefore, the engine is controlled in the low-output mode on a sloped road with a high gradient. Accordingly, fuel consumption can be improved. However, on flat ground or a road with a low gradient, the vehicle speed or the acceleration of the work machine is decreased.

However, on flat ground or a road with a low gradient, the output of the engine increases and a decrease in the vehicle speed or the acceleration of the work machine can be suppressed by cancelling the low-output mode. However, even if the output command of the engine is increased, the actual output of the engine does not increase immediately. As a result, it is difficult to quickly suppress a reduction in the vehicle speed or the acceleration of the work machine.

An object of the present disclosure is to improve fuel consumption and quickly suppress a reduction of the vehicle speed or the acceleration in a work machine.

A work machine according to a first aspect comprises an engine, a transmission, a travel device, a sensor, and a controller. The transmission is connected to the engine. The transmission is configured to change a transmission gear ratio continuously. The travel device is connected to the transmission. The travel device causes the machine to travel. The sensor is a sensor for detecting the acceleration of the machine. The controller selectively executes a first mode and a second mode. In the second mode, a target tractive force of the machine is limited in comparison to the first mode.

The controller weakens limitation of the target tractive force and determines the target tractive force when the acceleration of the machine during the second mode is less than a predetermined acceleration threshold. The controller determines a target transmission gear ratio in accordance with the target tractive force. The controller controls the transmission based on the target transmission gear ratio.

A method according to a second aspect is a control method for controlling a work machine. The work machine comprises an engine, a transmission, and a travel device. The transmission is connected to the engine. The transmission is configured to change the transmission gear ratio continuously. The travel device is connected to the transmission. The travel device causes the machine to travel. The method comprises the following processes.

A first process is detecting the acceleration of the machine. A second process is selectively executing a first mode and a second mode. In the second mode, the target tractive force of the machine is limited in comparison to the first mode. A third process is weakening the limitation of the target tractive force and determining the target tractive force when the acceleration of the machine during the second mode is less than a predetermined acceleration threshold. A fourth process is determining a target transmission gear ratio in accordance with the target tractive force. A fifth process is controlling the transmission based on the target transmission gear ratio.

In the present disclosure, the fuel consumption can be improved by controlling the transmission in the second mode. In addition, the controller weakens the limit of the target tractive force and determines the target tractive force when the acceleration of the machine during the second mode is less than a predetermined acceleration threshold. The target transmission gear ratio is then determined in accordance with the target tractive force and the transmission is controlled based on the target transmission gear ratio. As a result, a reduction in the vehicle speed or the acceleration can be quickly suppressed.

DETAILED DESCRIPTION OF EMBODIMENT(S)

Figure 1:
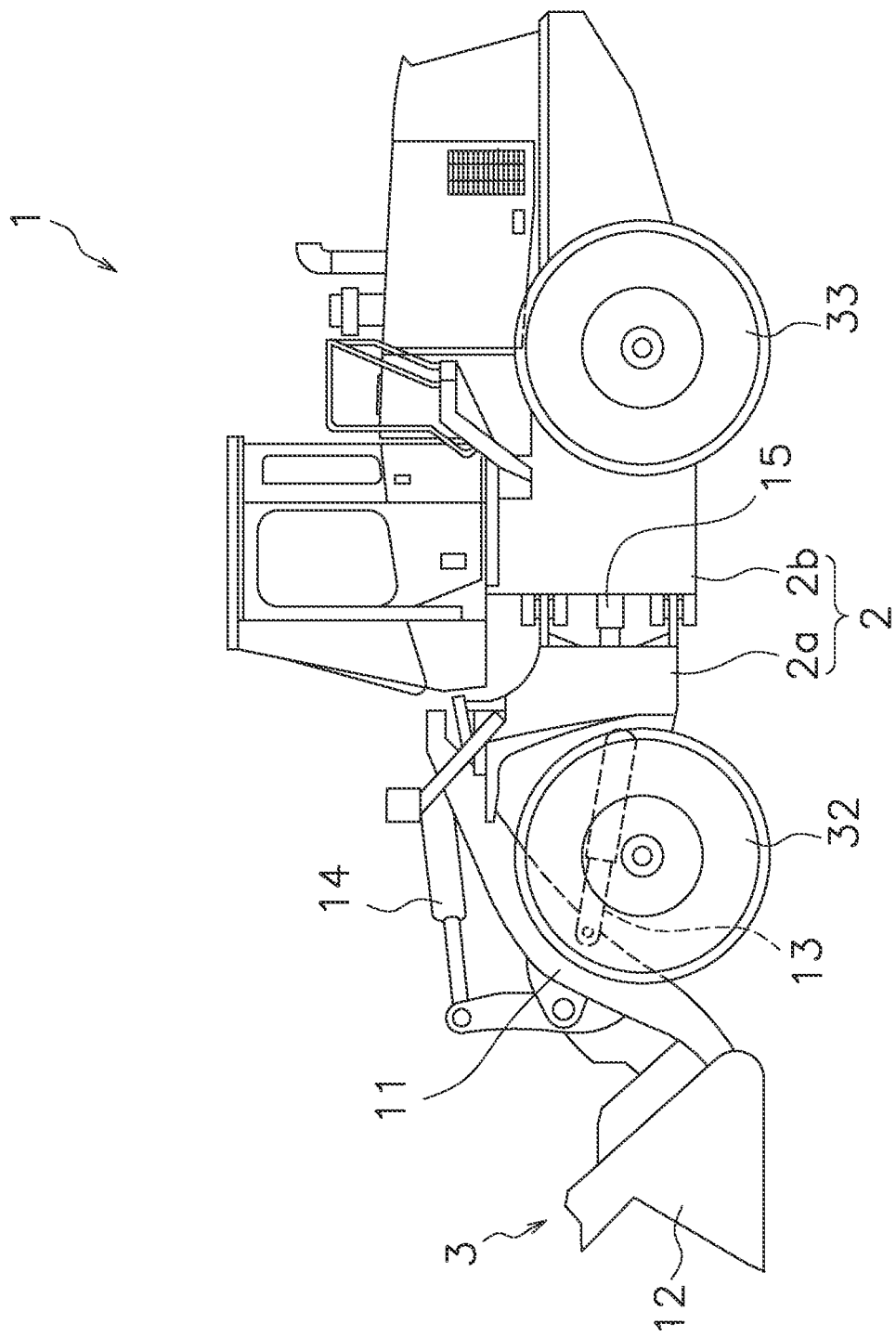
FIG. 1 is a side view of a work machine according to an embodiment

An embodiment of the present invention will be explained in detail with reference to the figures. FIG. 1 is a side view of a work machine 1 according to an embodiment of the present invention. As illustrated in FIG. 1, the work machine 1 includes a vehicle body 2 and a work implement 3.

The vehicle body 2 includes a front vehicle body 2a and a rear vehicle body 2b. The rear vehicle body 2b is connected so as to be able to turn to the left and right with respect to the front vehicle body 2a. The front vehicle body 2a and the rear vehicle body 2b are coupled by a hydraulic cylinder 15. The hydraulic cylinder 15 extends and contracts to turn the front vehicle body 2a to the left and right with respect to the rear vehicle body 2b.

The work implement 3 is used for work such as excavation. The work implement 3 is attached to the front vehicle body 2a. The work implement 3 includes a boom 11, a bucket 12, and hydraulic cylinders 13 and 14. The hydraulic cylinders 13 and 14 extend and contract to movie the boom 11 and the bucket 12.

Figure 2:
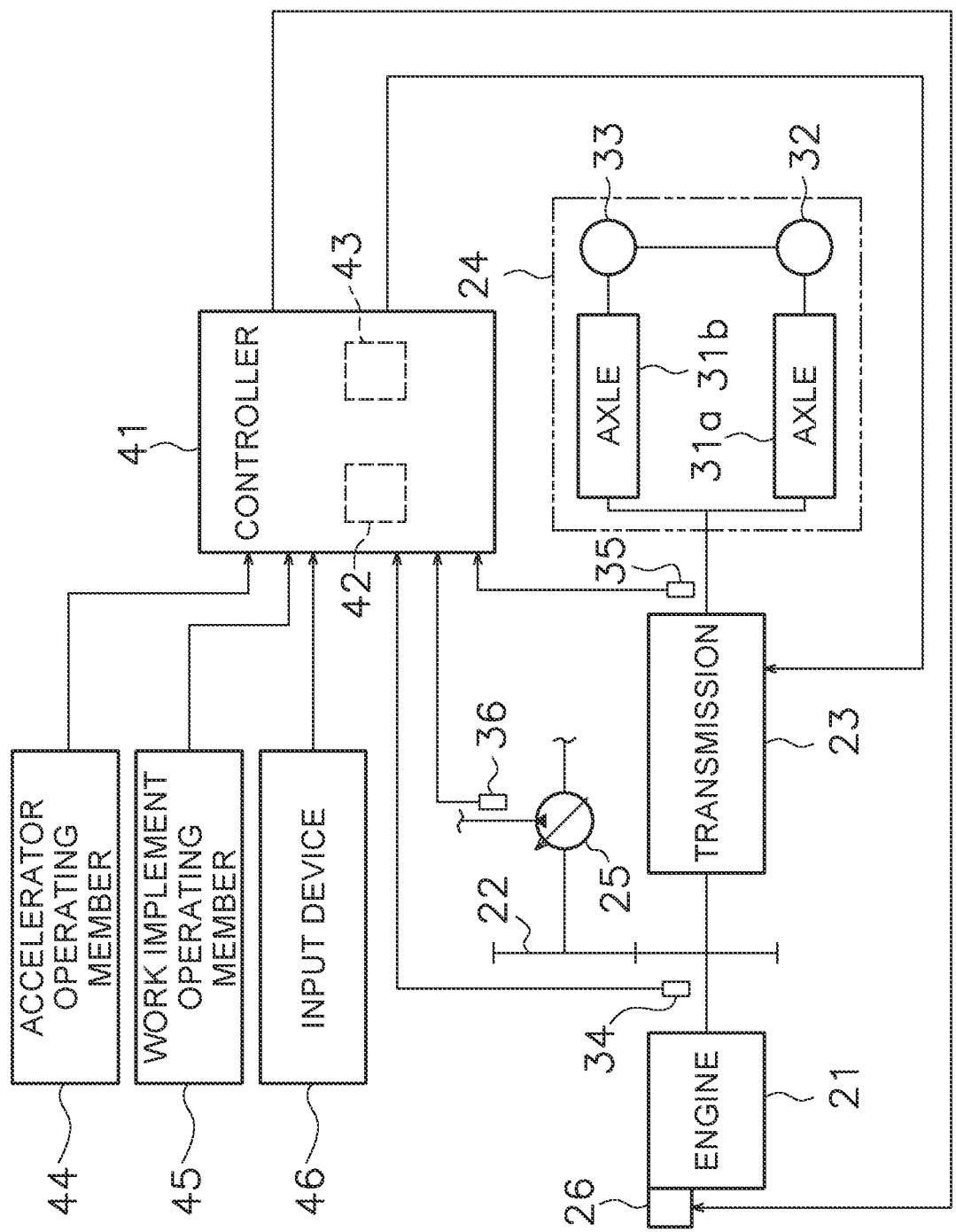
FIG. 2 is a block diagram illustrating a configuration of a drive system and a control system of the work machine.

FIG. 2 is a block diagram illustrating a configuration of a drive system and a control system of the work machine 1. As illustrated in FIG. 2, the drive system of the work machine 1 includes an engine 21, a power take-off (PTO) 22, a transmission 23, a travel device 24, and a hydraulic pump 25.

The engine 21 is, for example, a diesel engine. The engine 21 includes a fuel injection device 26. The fuel injection device 26 adjusts the amount of fuel injected into the cylinders of the engine 21 to control the output of the engine 21. The PTO 22 distributes the driving power of the engine 21 between the transmission 23 and the hydraulic pump 25. Only one hydraulic pump 25 is illustrated in FIG. 2. However, two or more hydraulic pumps may be connected to the engine 21 via the PTO 22.

The transmission 23 is connected to the engine 21. The transmission 23 is a continuously variable transmission (CVT) transmission. That is, the transmission 23 is configured to change the transmission gear ratio continuously. The transmission gear ratio is the ratio of the rotation speed of an input shaft with respect to the rotation speed of an output shaft of the transmission 23. For example, the transmission 23 may be a hydro-sialic transmission (HST). However, the transmission 23 may be another type of transmission such as a hydraulic mechanical transmission (HMT) or an electric mechanical transmission (EMT).

The travel device 24 causes the work machine 1 to travel. The travel device 24 includes axles 31a and 31b, front wheels 32, and rear wheels 33. The axles 31a and 31b are connected to the transmission 23. The front wheels 32 are provided to the front vehicle body 2a. The rear wheels 33 are provided to the rear vehicle body 2b. The axles 31a and 31b transmit driving power from the transmission 23 to the front wheels 32 and the rear wheels 33.

The hydraulic pump 25 is connected to the engine 21 via the PTO 22. The hydraulic pump 25 is driven by the engine 21 to discharge hydraulic fluid. The hydraulic fluid discharged from the hydraulic pump 25 is supplied to the aforementioned hydraulic cylinders 13 to 15.

The control system of the work machine 1 includes an engine sensor 34, a vehicle speed sensor 35, and a pump sensor 36. The engine sensor 34 detects the engine rotation speed. The vehicle speed sensor 35 detects the output rotation speed. The output rotation speed is, for example, the rotation speed of the output shaft of the transmission 23. However, the output rotation speed may be the rotation speed of another rotating element that is inside the transmission 23 or is positioned downstream of the transmission 23. The pump sensor 36 detects the discharge pressure of the hydraulic pump 25.

The control system of the work machine 1 includes a controller 41. The controller 41 is configured to control the work machine 1. The controller 41 receives a signal indicating the engine rotation speed from the engine sensor 34. The controller 41 receives a signal indicating the output rotation speed from the vehicle speed sensor 35. The controller 41 receives a signal indicating the discharge pressure of the hydraulic pump 25 from the pump sensor 36. The controller 41 transmits instruction signals to the engine 21 and the transmission 23.

The controller 41 includes a processor 42 and a storage device 43. The processor 42 may be a central processing unit (CPU) for example. Alternatively, the processor 42 may be a processor other than a CPU. The processor 42 executes processing for controlling the work machine 1 in accordance with a program. The storage device 43 includes a non-volatile memory such as a ROM and a volatile memory such as a RAM. The storage device 43 may include an auxiliary storage device such as a hard disk or a solid state drive (SSD). The storage device 43 is an example of a non-transitory computer-readable recording medium. The storage device 43 stores programs and data for controlling the work machine 1.

The control system of the work machine 1 includes an accelerator operating member 94, a work implement operating member 45, and an input device 46. The accelerator operating member 94 is operable by an operator for controlling the travel of the work machine 1. The accelerator operating member 94 is, for example, a pedal. However, the accelerator operating member 94 may be another member such as a lever or a switch.

The work implement operating member 45 is operable by an operator for controlling the work implement 3. The work implement operating member 45 is, for example, a lever. However, the work implement operating member 45 may be another member such as a switch or a pedal. The input device 46 is operable by the operator for selecting a control mode of the work machine 1. The input device 46 includes, for example, a touch screen. However, the input device 46 may include another member such as a mechanical switch.

The controller 41 receives a signal indicating an accelerator operating amount from the accelerator operating member 94. The accelerator operating amount is the operating amount of the accelerator operating member 94. The controller 41 receives a signal indicating a work implement operating amount from the work implement operating member 45. The work implement operating amount is the operating amount of the work implement operating member 45.

The controller 41 receives a signal indicating the selection of a control mode from the input device 46. The control mode includes a first mode and a second mode. However, the controller 41 may automatically select a control mode in response to a load applied to the work machine 1.

Figure 3:
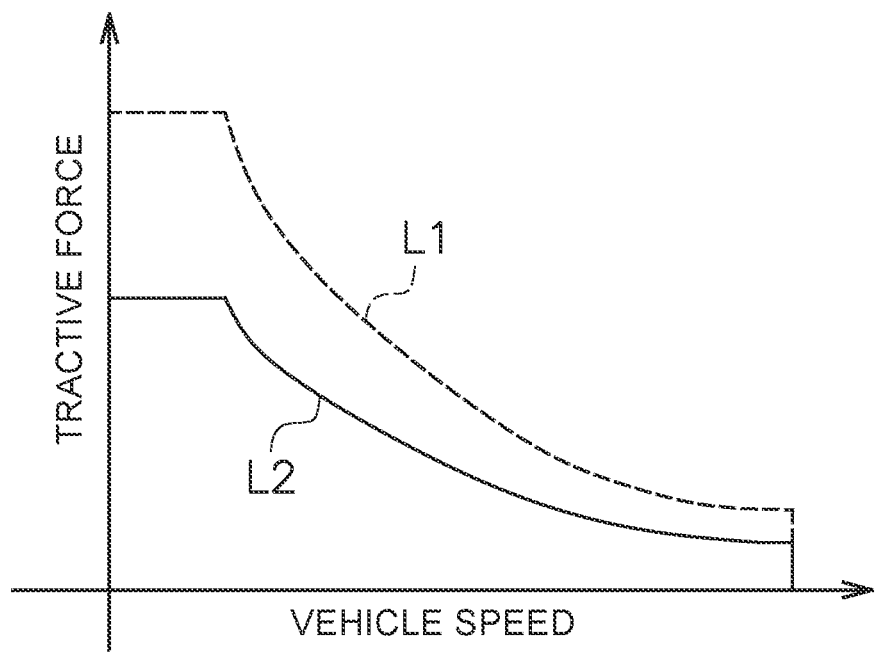
FIG. 3 illustrates an example of tractive force—vehicle speed characteristics.

FIG. 3 illustrates respective tractive force—vehicle speed characteristics of the first mode and the second mode. L1 in FIG. 3 represents the tractive force—vehicle speed characteristics in the first mode. L2 represents the tractive force—vehicle speed characteristics in the second mode. The tractive force—vehicle speed characteristics represent the maximum tractive force at each vehicle speed. As illustrated in FIG. 3, in the second mode, the tractive force of the work machine 1 is limited in comparison to the first mode. The controller 41 controls the engine 21 and the transmission 23 in accordance with the control mode selected from the first mode and the second mode.

Figure 4:
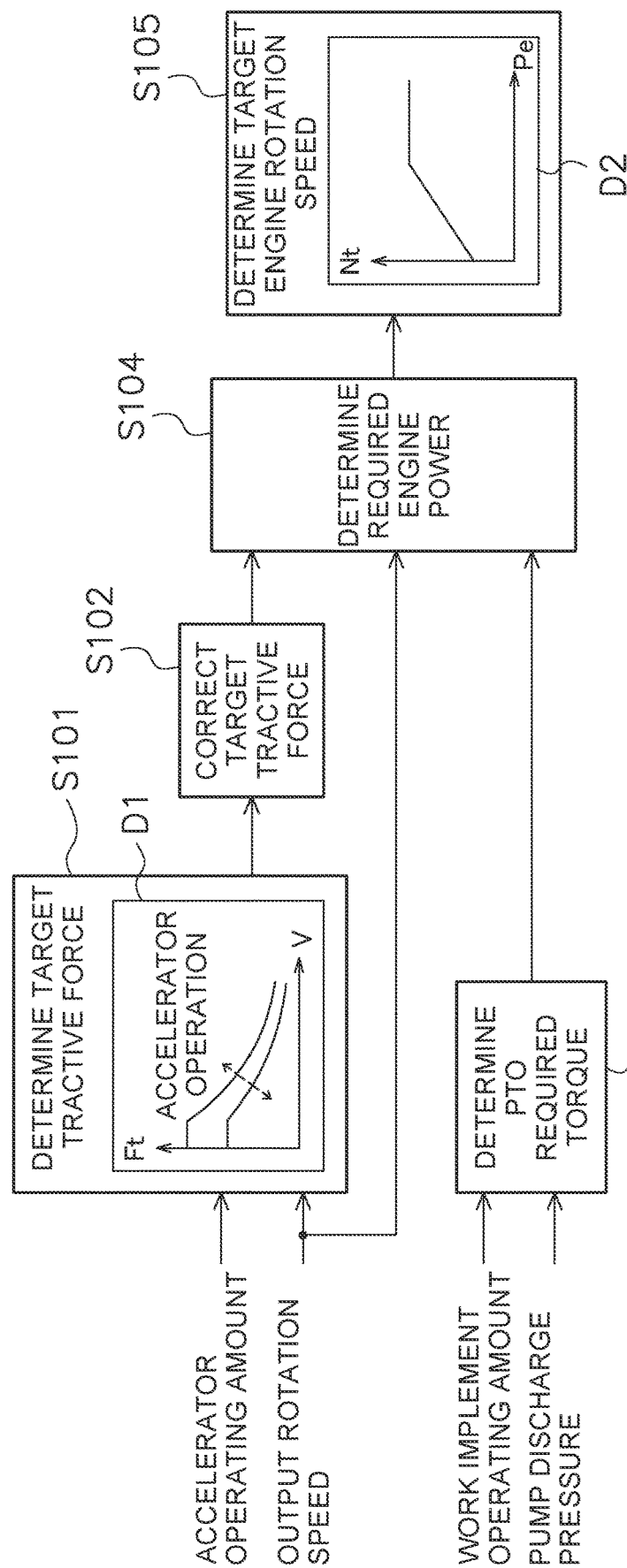
FIG. 4 is a block diagram illustrating processing for controlling the engine.

Processing for controlling the engine 21 and the transmission 23 and executed by the controller 41 is explained hereinbelow. FIG. 4 is a block diagram illustrating processing for controlling the engine 21. As illustrated in step S101 in FIG. 4, the controller 41 determines a target tractive force.

The controller 41 determines the target tractive force from the accelerator operating amount and the output rotation speed. For example, the controller 41 stores target tractive force data D1. The target tractive force data D1 prescribes the relationship between the vehicle speed V and the target tractive force Ft. The target tractive force data D1 is changed in response to the accelerator operating amount. The controller 41 calculates the vehicle speed V from the output rotation speed. The controller 41 refers to the target tractive force data D1 and determines the target tractive force Ft from the accelerator operating amount and the vehicle speed V.

In step S102, the controller 41 corrects the target tractive force. The controller 41 corrects the target tractive force by multiplying the target tractive force by a tractive force coefficient. The tractive force coefficient is explained below.

In step S103, the controller 41 determines a PTO required torque. The controller 41 determines the PTO required torque from the work implement operating amount and the discharge pressure of the hydraulic pump 25. The PTO required torque is the required torque of the implement connected to the engine 21 via the PTO 22. The PTO required torque includes the required torque of the hydraulic pump 25. For example, the controller 41 determines the required flow rate of hydraulic fluid based on the work implement operating amount. The controller 41 determines the PTO required torque from the required flow rate and the discharge pressure. If two or more hydraulic pumps are connected to the engine 21 via the PTO 22, the PTO required torque may further include the required torques of the other hydraulic pumps.

In step S104, the controller 41 determines a required engine power. The required engine power is the required horsepower of the engine 21. The controller 41 determines the required engine power from the PTO required torque and the target tractive force. For example, the controller 41 determines the required engine power from the sum of the PTO required torque and the target tractive force.

In step S105, the controller 41 determines a target engine rotation speed. The controller 41 determines the target engine rotation speed from the required engine power. For example, the controller 41 stores target engine rotation speed data D2. The target engine rotation speed data D2 prescribes the relationship between the required engine power Pe and the target engine rotation speed Nt. The controller 41 refers to the target engine rotation speed data D2 and determines the target engine rotation speed Nt from the required engine power Pe.

The controller 41 determines an instruction to the fuel injection device 26 in response to the target engine rotation speed determined as described above. Consequently, the output of the engine 21 is controlled to that the target tractive force and the PTO required torque are attained.

The controller 41 determines the target acceleration torque of the engine 21 from the target engine rotation speed and the current engine rotation speed. The controller 41 may also determine the target torque of the engine 21 from the PTO required torque, the target tractive force, and the target acceleration torque. The controller 41 may control the engine 21 based on the target torque of the engine 21.

Figure 5:
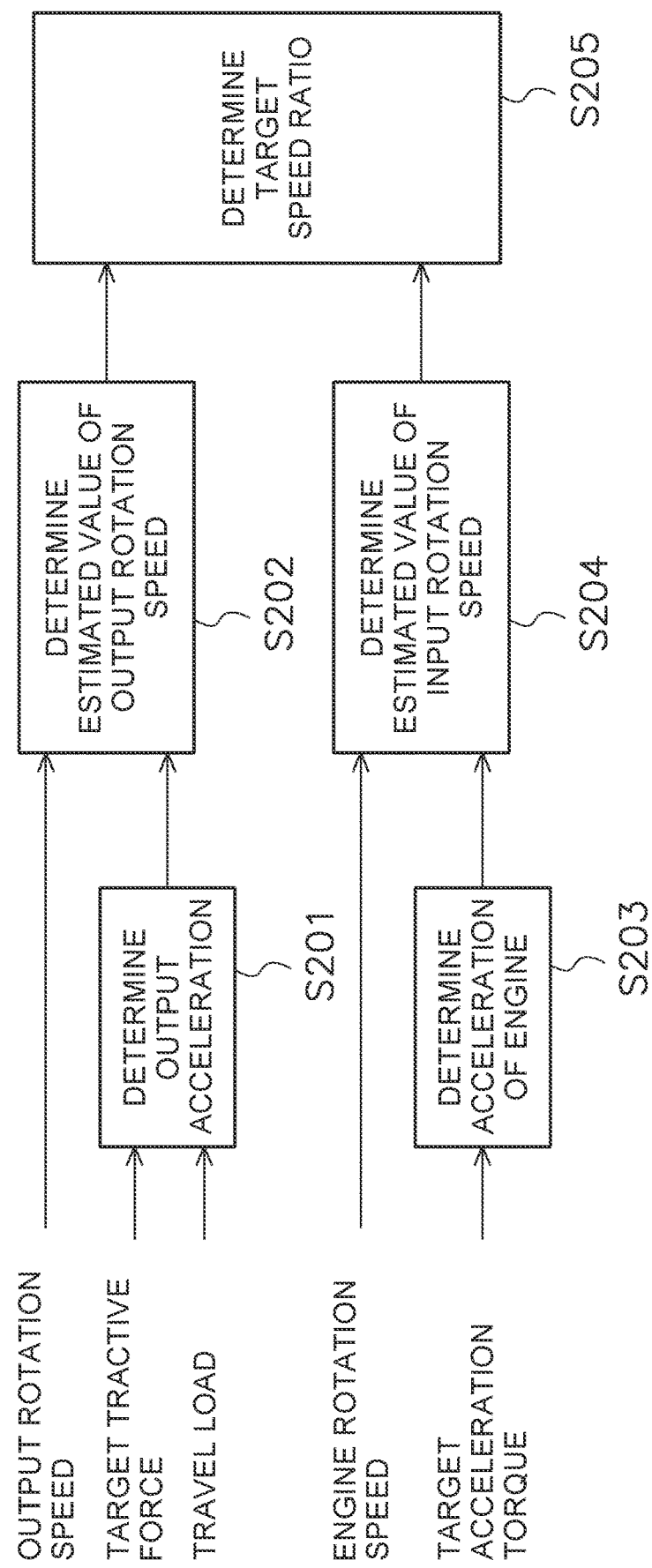
FIG. 5 is a block diagram illustrating processing for controlling the transmission.

FIG. 5 is a block diagram illustrating processing for controlling the transmission 23. As illustrated in step S201 in FIG. 5, the controller 41 determines an output acceleration. The output acceleration is, for example, the acceleration of the output shaft of the transmission 23. However, the output acceleration may be the acceleration of another rotating element that is inside the transmission 23 or is positioned downstream of the transmission 23. The output acceleration includes deceleration of the output shaft of the transmission 23. For example, an output acceleration that is a negative value signifies deceleration. The controller 41 determines the output acceleration of the transmission 23 from the target tractive force and a travel load. For example, the controller 41 calculates the travel load from the output torque of the transmission 23, the acceleration of the work machine 1, and the weight of the work machine 1.

In step S202, the controller 41 determines an estimated value of the output rotation speed. The estimated value of the output rotation speed is a value estimated as the output rotation speed after a predetermined time period. The predetermined time period is, for example, determined from a control cycle of processing performed by the controller 41. The controller 41 determines the estimated value of the output rotation speed from the current output rotation speed and the output acceleration.

In step S203, the controller 41 determines the acceleration of the engine 21. The acceleration of the engine 21 is the acceleration of an output shaft of the engine 21. The acceleration of the engine 21 may be the acceleration of an input shaft of the transmission 23. The controller 41 determines the acceleration of the engine 21 from the target acceleration torque of the engine 21.

In step S204, the controller 41 determines an estimated value of the input rotation speed. The input rotation speed is, for example, the rotation speed of an input shaft of the transmission 23. The estimated value of the input rotation speed is a value estimated as the input rotation speed after a predetermined time period. The controller 41 determines the estimated value of the input rotation speed from the current engine rotation speed and the acceleration of the engine 21.

In step S205, the controller 41 determines a target speed ratio. The controller 41 determines the target speed ratio from the estimated value of the output rotation speed and the estimated value of the input rotation speed. The target speed ratio is a ratio of the estimated value of the output rotation speed and the estimated value of the input rotation speed.

The controller 41 determines an instruction to the transmission 23 so that the speed ratio of the transmission 23 becomes the target speed ratio. For example, when the transmission 23 is an HST, the controller 41 determines target displacements of the hydraulic pump and the hydraulic motor of the HST in response to the target speed ratio. When the transmission 23 is an HMT, the controller 41 determines a target torque of the hydraulic motor of the HMT in response to the target speed ratio in the same way as with the HST When the transmission 23 is an EMT, the controller 41 determines a target torque of the electric motor of the EMT in response to the target speed ratio. Consequently, the speed ratio of the transmission 23 is controlled so that the target tractive force and the target engine rotation speed are attained.

Next, processing for correcting the target tractive force in response to the control mode in step S102 will be explained. As described above, the controller 41 corrects the target tractive force by multiplying the target tractive force determined in step S101 by the tractive force coefficient. The tractive force coefficient is changed in response to the selected control mode. For example, the tractive force coefficient in the first mode is 1. Therefore, the controller 41 determines the initial target tractive force determined in step S101 as the target tractive force without correction.

When the second mode is selected, the tractive force coefficient in the first mode becomes a value smaller than 1.

Consequently, in the second mode, the target tractive force is corrected so as to be smaller than that of the first mode.

Figure 6:
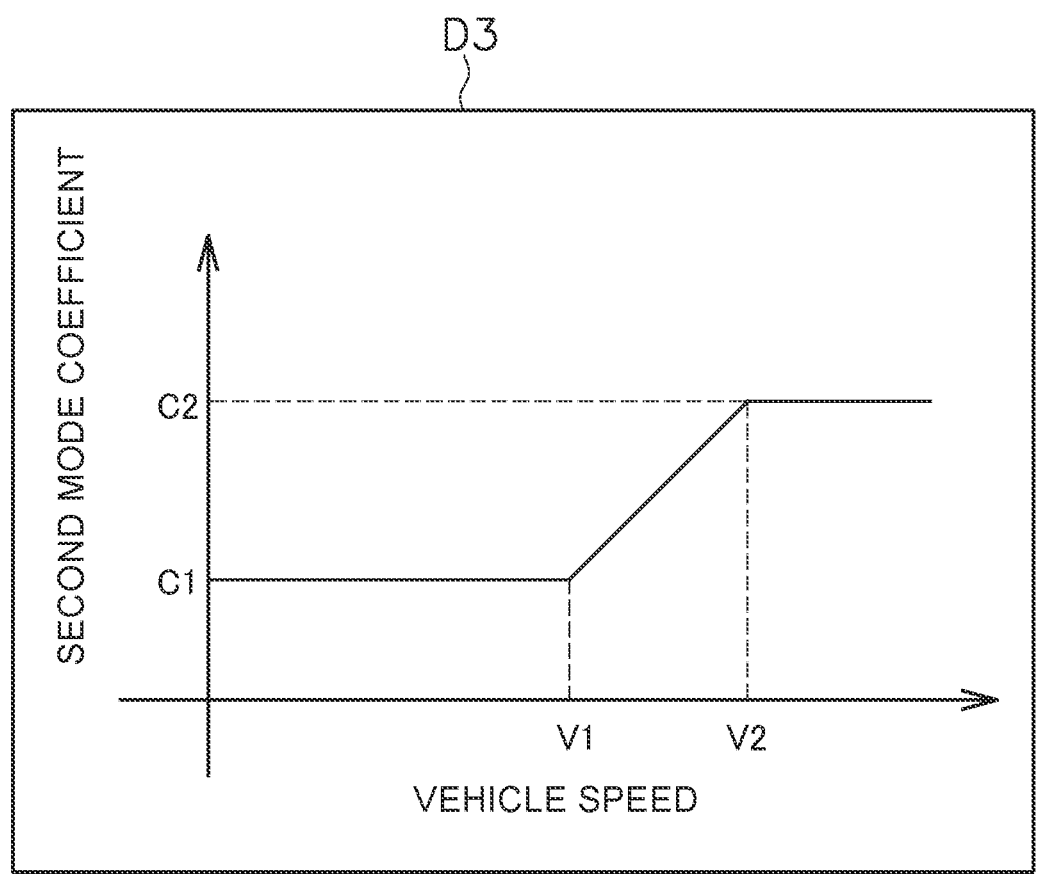
FIG. 6 illustrates an example of second mode coefficient data.

When the second mode is selected, the controller 41 determines a second mode coefficient in accordance with the vehicle speed as the tractive force coefficient. The controller 41 stores second mode coefficient data D3. The second mode coefficient data D3 prescribes the relationship between the vehicle speed and the second mode coefficient. FIG. 6 illustrates an example of the second mode coefficient data D3. As illustrated in FIG. 6, the second mode coefficient is C1 when the vehicle speed is V1 or less in the second mode coefficient data D3. C1 is less than 1. The second mode coefficient is C2 when the vehicle speed is V2 or greater in the second mode coefficient data D3. C2 is greater than C1. C2 may also be one. Alternatively, C2 may be smaller than 1. The second mode coefficient increases in response to an increase of the vehicle speed when the vehicle speed is in a range between V1 and V2.

Therefore, the second mode coefficient is less than 1 at least when the vehicle speed is less than V2. As a result, the target tractive force is corrected to a value smaller than the initial target tractive force determined in step S101. Consequently, in the second mode, the target tractive force is limited to a value smaller than that of the first mode. In particular, when traveling at a low speed in the second mode, the target tractive force is limited so as to be small. Accordingly, fuel consumption of the work machine 1 can be improved. In addition, the controller 41 increases the tractive force coefficient in response to an increase of the vehicle speed. Consequently, the maximum vehicle speed when traveling at a high speed in the second mode can approach the maximum vehicle speed in the first mode.

Figure 7:
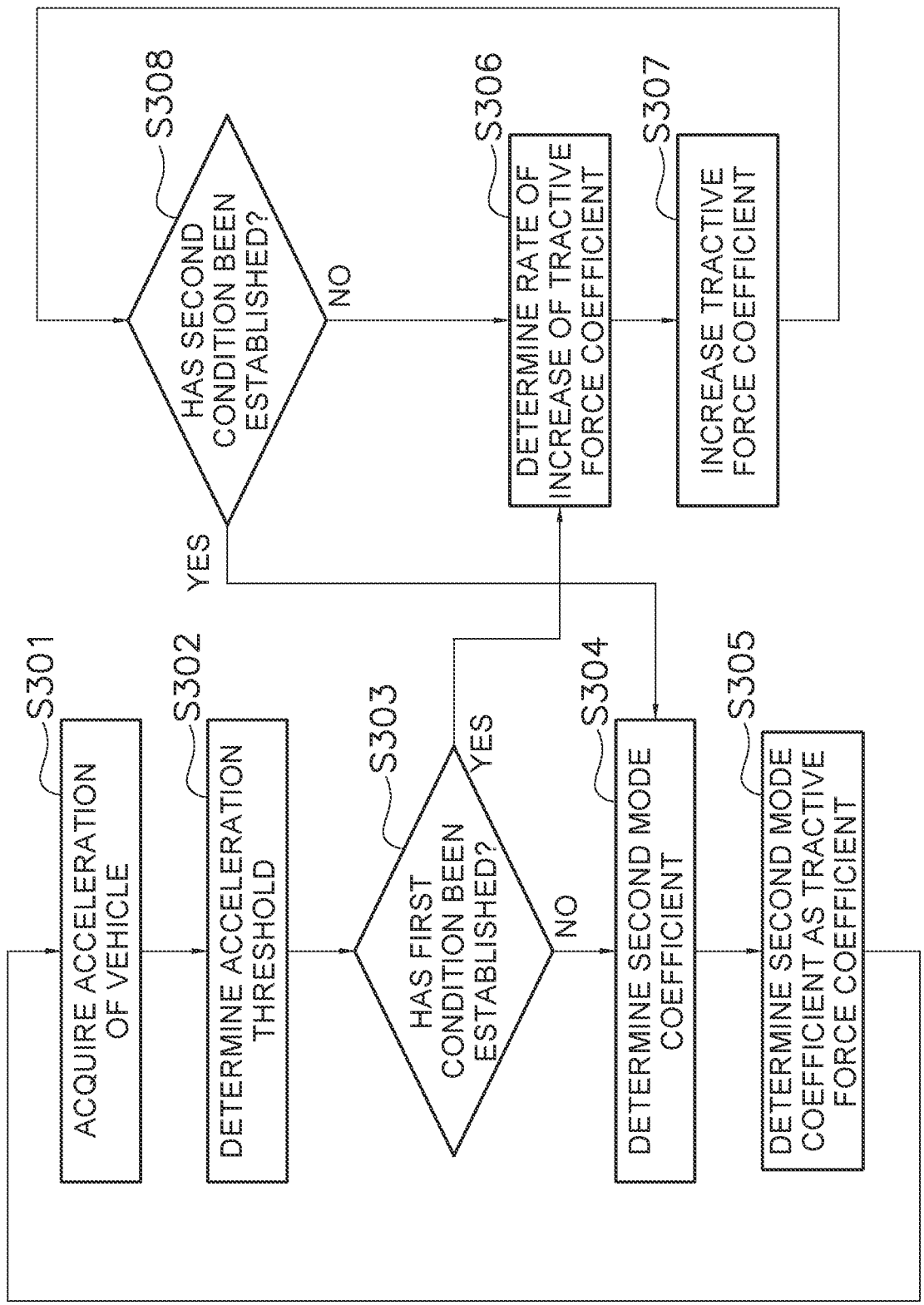
FIG. 7 is a flow chart of processing for limit alleviation control.

Moreover, the controller 41 executes a control (referred to below as "limit alleviation control") for weakening the limit of the target tractive force in response to the acceleration of the work machine 1 in the second mode. The limit alleviation control is explained below. FIG. 7 is a flow chart of processing for the limit alleviation control. In step S301 as illustrated in FIG. 7, the controller 41 acquires the acceleration of the work machine 1. The controller 41 calculates the acceleration of the work machine 1 from the vehicle speed.

Figure 8:
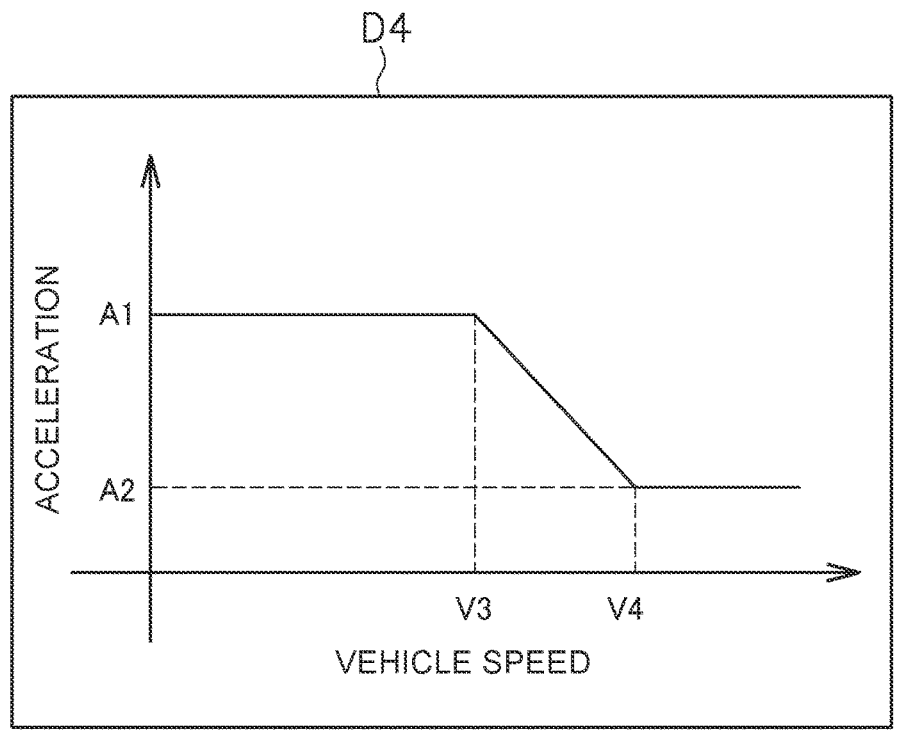
FIG. 8 illustrates an example of acceleration threshold data.

In step S302, the controller 41 determines an acceleration threshold. The controller 41 refers to acceleration threshold data D4 and determines the acceleration threshold from the vehicle speed. FIG. 8 illustrates an example of the acceleration threshold data D4. The acceleration threshold data D4 prescribes the relationship between the vehicle speed and the acceleration threshold. As illustrated in FIG. 8, the acceleration threshold is A1 when the vehicle speed is V3 or less in the acceleration threshold data D4. The acceleration threshold is A2 when the vehicle speed is V4 or less in the acceleration threshold data D4. A2 is smaller than A1. The acceleration threshold decreases in response to an increase of the vehicle speed when the vehicle speed is between V3 and V4 in the acceleration threshold data D4. Therefore, the controller 41 reduces the acceleration threshold in response to an increase in the vehicle speed.

In step S303, the controller 41 determines whether a first condition has been established. The first condition is a condition for alleviating the limit of the target tractive force. The first condition includes the following conditions (a1), (b1), and (c1) as AND conditions.

(a1) Accelerator operating amount>first operation threshold
(b1) The work machine 1 is traveling
(c1) Acceleration of work machine 1<acceleration threshold The first operation threshold is, for example, 100%. However, the first operation threshold may be less than 100%. The controller 41 determines whether the work machine 1 is traveling from, for example, the state of the work implement 3 and/or the transmission 23.

When the first condition has not been established in step S303, the processing advances to step S304. In step S304, the controller 41 determines the second mode coefficient from the second mode coefficient data D3 as described above. In step S305, the controller 41 then determines the second mode coefficient as the tractive force coefficient.

Figure 9:
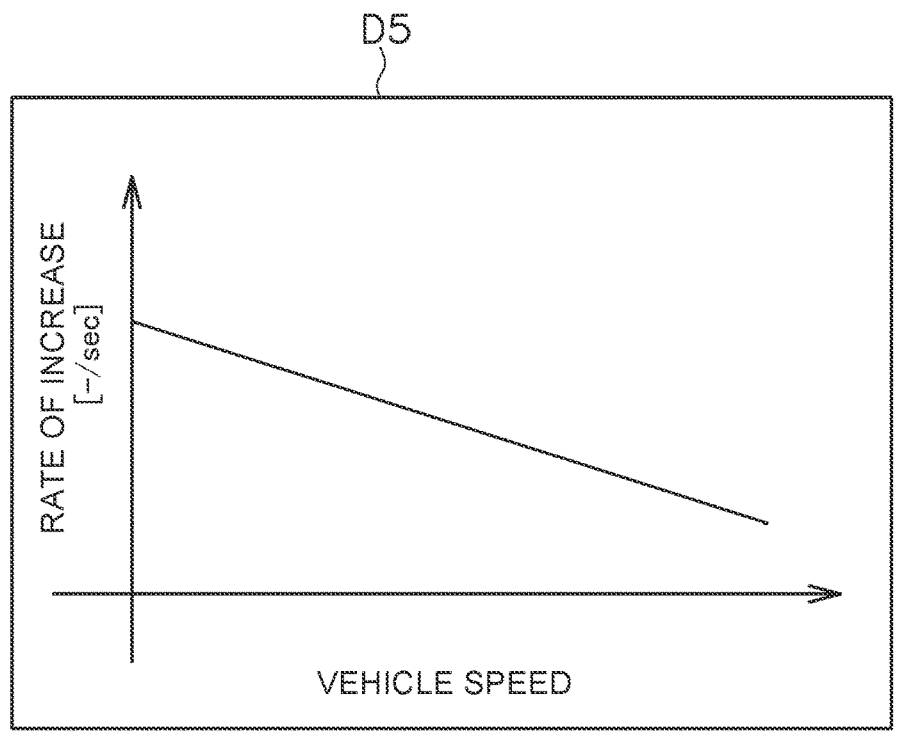
FIG. 9 illustrates an example of rate of increase data.

When the first condition has been established in step S303, the processing advances to step S306. In step S306, the controller 41 determines a rate of increase of the tractive force coefficient. The controller 41 refers to rate of increase data D5 and determines the rate of increase of the tractive force coefficient from the vehicle speed. FIG. 9 illustrates an example of the rate of increase data D5. The rate of increase of the tractive force coefficient decreases in response to an increase of the vehicle speed in the rate of increase data D5.

In step S307, the controller 41 increases the tractive force coefficient. The controller 41 gradually increases the tractive force coefficient at the rate of increase of the tractive force coefficient determined in step S306. Therefore, when the first condition is established in the second mode, the limit of the target tractive force is alleviated and the target tractive force increases more than in the second mode. However, the controller 41 increases the tractive force coefficient so as not to exceed 1. The tractive force coefficient being 1 signifies that the target tractive force is the same as in the first mode.

The controller 41 executes the abovementioned processing from steps S101 to S105 and determines the target engine rotation speed based on the corrected target tractive force. Therefore, the controller 41 increases the engine rotation speed more than in the second mode in response to the increase of the tractive force coefficient. The controller 41 also executes the abovementioned processing from steps S201 to S205 and determines a target speed ratio based on the corrected target tractive force. Therefore, the controller 41 increases the target transmission gear ratio in response to the increase of the tractive force coefficient In step S308, the controller 41 determines whether a second condition has been established. The second condition is a condition for cancelling the limit alleviation control and returning the control mode to the normal second mode. The second condition includes the following conditions (a2) and (b2) as OR conditions.

(a2) Accelerator operating amount<second operation threshold
(b2) The work machine 1 is in a state other than traveling.

The second operation threshold may be the same as the first operation threshold or may be different. The second operation threshold is, for example, 100%. However, the second operation threshold may be less than 100%. The state other than traveling is, for example, excavating or switching between forward and reverse travel. For example, the controller 41 determines whether the work machine 1 is in a slate other than traveling from, for example, the slate of the work implement 3 and/or the transmission 23.

When the second condition has been established in step S308, the processing returns to step S304. That is, the control mode returns to the normal second mode. When the second condition has not been established in step S308, the processing returns to step S306.

In the work machine 1 according to the present embodiment described above, the fuel consumption can be improved by controlling the engine 21 and the transmission 23 in the second mode. In addition, the limit of the target tractive force is weaken and the target tractive force is determined when the acceleration of the work machine 1 during the second mode is less than the acceleration threshold. The engine 21 is then controlled based on the target tractive force. As a result, a reduction in the vehicle speed or the acceleration can be suppressed. Furthermore, the target transmission gear ratio is determined in accordance with the target tractive force and the transmission 23 is controlled based on the target transmission gear ratio. As a result, a reduction in the vehicle speed or the acceleration can be quickly suppressed.

Figure 10:
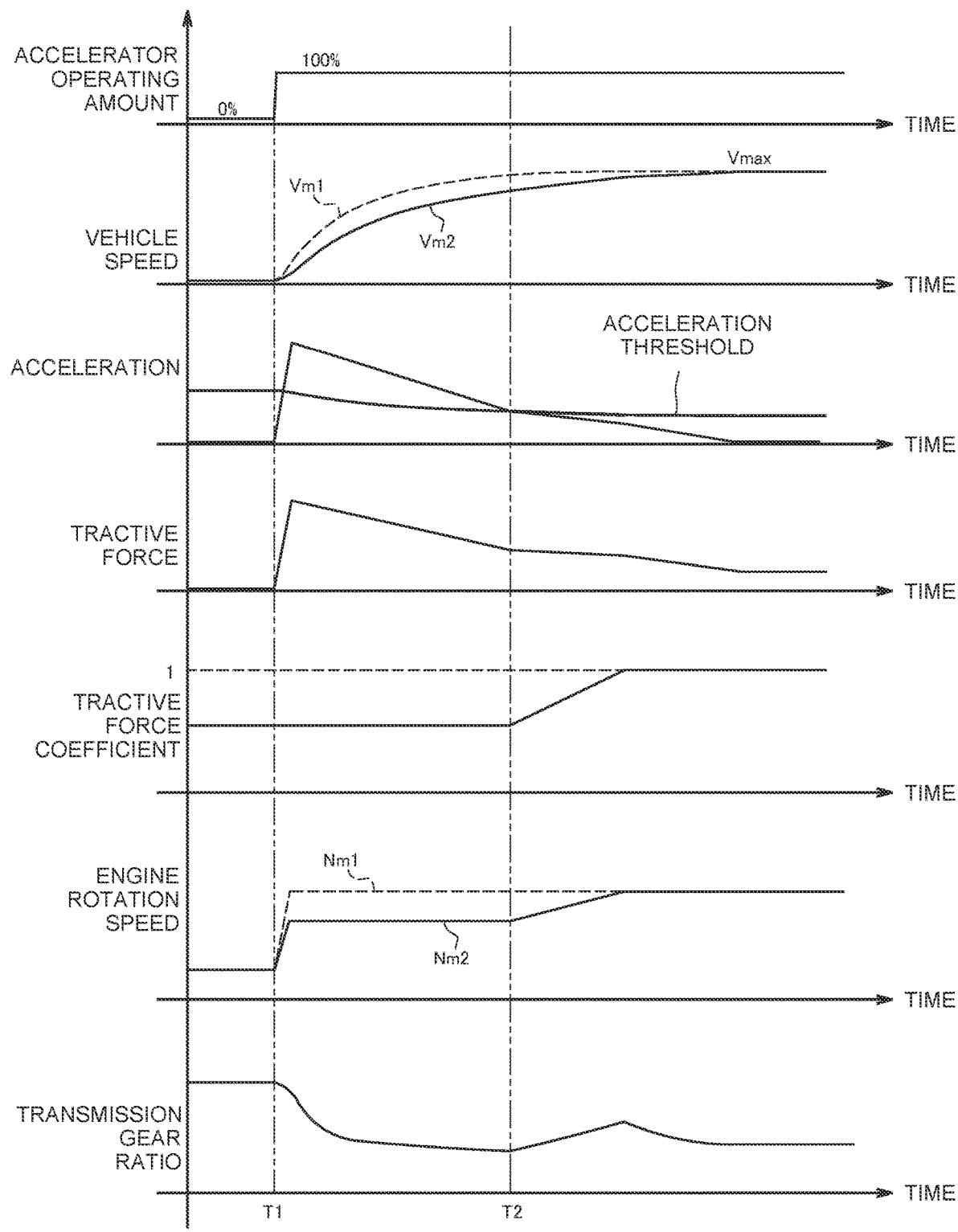
FIG. 10 is a timing chart illustrating changes in parameters when the limit alleviation control is executed in the second mode.

For example, FIG. 10 is a timing chart illustrating changes in parameters when the limit alleviation control is executed during the second mode. The first operation threshold is 100% in the examples illustrated in FIG. 10. Changes in the parameters when the second mode is selected as the control mode are illustrated in FIG. 10. However, the dashed line Vm1 indicates the change in the vehicle speed when the first mode is selected. The solid line Vm2 indicates the change in the vehicle speed when the second mode is selected. The dashed line Nm1 indicates the change in the engine rotation speed when the first mode is selected. The solid line Nm2 indicates the change in the engine rotation speed when the second mode is selected.

As illustrated in FIG. 10, at the time T1, the operator operates the accelerator operating member 94 thereby increasing the accelerator operating amount from 0% to 100%. Consequently, the vehicle speed, the acceleration, the tractive force, and the engine rotation speed increase from the time T1 onward. In addition, the transmission gear ratio decreases in response to the increase of the vehicle speed. However, the acceleration and the tractive force decrease thereafter and the acceleration becomes smaller than the acceleration threshold from the time T2. The controller 41 then gradually increases the tractive force coefficient toward the upper limit 1. As a result, the reductions in the acceleration and the tractive force are alleviated. In addition, the transmission gear ratio and the engine rotation speed are controlled so as to gradually increase. As a result, the vehicle speed gradually increases and is capable of reaching a vehicle speed that is the same as the maximum vehicle speed Vmax in the first mode.

Although an embodiment of the present invention has been described so far, the present invention is not limited to the above embodiment and various modifications may be made within the scope of the invention. The work machine 1 is not limited to a wheel loader and may be another machine such as a bulldozer or a motor grader.

The processing for controlling the engine 21 and the transmission 23 is not limited to the abovementioned processing and may be changed or omitted, or other processing may be added. The processing for the limit alleviation control is not limited to the abovementioned processing and may be changed or omitted, or other processing may be added. The sequence of the execution of the processing is not limited to the above embodiment and may be changed. The abovementioned data D1 to D5 are not limited to the above and may be changed.

The first condition is not limited to the abovementioned conditions and the conditions may be changed or omitted, or another condition may be added. For example, the first condition may include a brake operating amount of the work machine 1 being less than a predetermined first brake threshold. The second condition is not limited to the abovementioned conditions and the conditions may be changed or omitted, or another condition may be added. For example, the second condition may include a brake operating amount of the work machine 1 being greater than a predetermined second brake threshold.

According to the present disclosure, fuel consumption can be improved and a reduction of the vehicle speed or the acceleration can be quickly suppressed.

The invention claimed is:

1. A work machine comprising:
   an engine;
   a transmission connected to the engine, the transmission being configured to change a transmission gear ratio continuously;
   a travel device connected to the transmission, the travel device causing the work machine to travel;
   a sensor arranged and configured to detect an acceleration of the work machine; and
   a controller configured to
      selectively execute a first mode and a second mode that limits a target tractive force of the machine in comparison to the first mode,
      weaken limitation of the target tractive force and determine the target tractive force when the acceleration of the machine in the second mode is less than a predetermined acceleration threshold,
      determine a target transmission gear ratio in accordance with the target tractive force, and
      control the transmission based on the target transmission gear ratio.

2. The work machine according to claim 1, wherein the controller is further configured to
   determine the target tractive force in the second mode by multiplying the target tractive force in the first mode by a tractive force coefficient, and
   increase the tractive force coefficient when the acceleration of the machine in the second mode is less than the predetermined acceleration threshold.

3. The work machine according to claim 2, wherein the controller is further configured to increase the target transmission gear ratio in response to an increase of the tractive force coefficient.

4. The work machine according to claim 2, wherein the controller is further configured to
   determine a rate of increase of the tractive force coefficient in response to a vehicle speed, and
   increase the tractive force coefficient by the rate of increase.

5. The work machine according to claim 4, wherein the controller is further configured to reduce the rate of increase in response to an increase of the vehicle speed.

6. The work machine according to claim 2, wherein the controller is further configured to determine the tractive force coefficient in response to the vehicle speed.

7. The work machine according to claim 2, wherein the controller is further configured to increase the tractive force coefficient in response to an increase of the vehicle speed.

8. The work machine according to claim 1, wherein the controller is further configured to determine the predetermined acceleration threshold in response to a vehicle speed.

9. The work machine according to claim 1, wherein the controller is further configured to reduce the predetermined acceleration threshold in response to an increase of a vehicle speed.

10. The work machine according to claim 1, further comprising:
an accelerator operating member that is operable by an operator,
the controller being further configured to
acquire an operating amount of the accelerator operating member,
weaken the limitation of the target tractive force and determine the target tractive force when
the operating amount of the accelerator operating member is greater than a predetermined operation threshold of the accelerator operating member and
the acceleration of the machine is less than the predetermined acceleration threshold in the second mode,
determine the target transmission gear ratio in accordance with the target tractive force, and
control the transmission based on the target transmission gear ratio.

11. The work machine according to claim 1, wherein
the controller is further configured to control the engine based on the target tractive force.

12. The work machine according to claim 1, further comprising:
a front vehicle body; and
a rear vehicle body connected to the front vehicle body so as to allow turning to the left and right,
the travel device including
a front wheel provided to the front vehicle body, and
a rear wheel provided to the rear vehicle body.

13. A control method for a work machine including an engine, a transmission connected to the engine and configured to change a transmission gear ratio continuously, and a travel device connected to the transmission and causing the work machine to travel, the control method comprising:
detecting an acceleration of the work machine;
selectively executing a first mode and a second mode that limits a target tractive force of the machine in comparison to the first mode;
weakening limitation of the target tractive force and determining the target tractive force when the acceleration of the machine in the second mode is less than a predetermined acceleration threshold;
determining a target transmission gear ratio in accordance with the target tractive force; and
controlling the transmission based on the target transmission gear ratio.

* * * * *